(12) United States Patent
Gorissen et al.

(10) Patent No.: US 11,800,902 B2
(45) Date of Patent: Oct. 31, 2023

(54) COOLING FABRIC

(71) Applicant: TEIJIN LIMITED, Osaka (JP)

(72) Inventors: Hans Gorissen, Velp (NL); Peter Gerard Akker, Doetinchem (NL); Alex Van Norel, Duiven (NL); Marijke Timmermans, Enschede (NL); Mukund Tiwari, Arnhem (NL); Marc-Jan De Haas, Apeldoorn (NL)

(73) Assignee: TEIJIN LIMITED, Osaka (JP)

( * ) Notice: Subject to any disclaimer, the term of this patent is extended or adjusted under 35 U.S.C. 154(b) by 237 days.

(21) Appl. No.: 16/342,300

(22) PCT Filed: Oct. 13, 2017

(86) PCT No.: PCT/IB2017/056360
§ 371 (c)(1),
(2) Date: Apr. 16, 2019

(87) PCT Pub. No.: WO2018/073710
PCT Pub. Date: Apr. 26, 2018

(65) Prior Publication Data
US 2019/0254361 A1     Aug. 22, 2019

(30) Foreign Application Priority Data

Oct. 18, 2016     (EP) .................................. 16194352

(51) Int. Cl.
*A41D 13/005* (2006.01)
*A41D 1/04* (2006.01)
(Continued)

(52) U.S. Cl.
CPC .......... *A41D 13/0053* (2013.01); *A41D 1/04* (2013.01); *B32B 3/08* (2013.01); *B32B 5/02* (2013.01);
(Continued)

(58) Field of Classification Search
CPC .. A41D 13/0053; A41D 1/04; A41D 2500/10; A41D 2500/20; A41D 2500/50;
(Continued)

(56) References Cited

U.S. PATENT DOCUMENTS

| 6,955,999 B1 | 10/2005 | Boye |
| 2006/0174392 A1 | 8/2006 | Farnworth et al. |

(Continued)

FOREIGN PATENT DOCUMENTS

| EP | 1 367 913 A1 | 12/2003 | |
| JP | 2009-056765 A | * 3/2009 | ............... B32B 5/02 |

(Continued)

OTHER PUBLICATIONS

Yip et al. "Study of Three-Dimensional Spacer Fabrics: Physical and Mechanical Properties" Journal of Materials Processing Technology (206) pp. 359-364. 2008. (Year: 2008).*

(Continued)

*Primary Examiner* — Elizabeth M Imani
(74) *Attorney, Agent, or Firm* — Oliff PLC

(57) ABSTRACT

A cooling fabric including a moisture-permeable inner surface layer, a spacer fabric and an outer surface layer, wherein the outer surface layer has an air permeability of at most 250 l/dm2/min at 500 Pa measured according to ISO 9237 and wherein the spacer fabric comprises monofilaments extending across the spacer fabric, wherein the monofilaments have a linear density of at least 250 dtex and wherein the monofilaments are present at a density of at most 800 monofilaments per square-inch.

9 Claims, 2 Drawing Sheets

(51) Int. Cl.
| | |
|---|---|
| B32B 5/02 | (2006.01) |
| B32B 5/26 | (2006.01) |
| B32B 27/12 | (2006.01) |
| B32B 27/36 | (2006.01) |
| B32B 27/40 | (2006.01) |
| B32B 7/022 | (2019.01) |
| B32B 7/027 | (2019.01) |
| D04B 21/20 | (2006.01) |
| B32B 27/30 | (2006.01) |
| B32B 3/08 | (2006.01) |
| B32B 5/10 | (2006.01) |
| B32B 27/32 | (2006.01) |
| B32B 27/28 | (2006.01) |
| B32B 27/34 | (2006.01) |

(52) U.S. Cl.
CPC .............. *B32B 5/022* (2013.01); *B32B 5/024* (2013.01); *B32B 5/026* (2013.01); *B32B 5/10* (2013.01); *B32B 5/26* (2013.01); *B32B 7/022* (2019.01); *B32B 7/027* (2019.01); *B32B 27/12* (2013.01); *B32B 27/286* (2013.01); *B32B 27/30* (2013.01); *B32B 27/306* (2013.01); *B32B 27/32* (2013.01); *B32B 27/34* (2013.01); *B32B 27/36* (2013.01); *B32B 27/365* (2013.01); *B32B 27/40* (2013.01); *D04B 21/207* (2013.01); *A41D 2500/10* (2013.01); *A41D 2500/20* (2013.01); *A41D 2500/50* (2013.01); *A41D 2600/20* (2013.01); *B32B 2250/03* (2013.01); *B32B 2250/20* (2013.01); *B32B 2262/0223* (2013.01); *B32B 2262/0253* (2013.01); *B32B 2262/0261* (2013.01); *B32B 2262/0276* (2013.01); *B32B 2262/103* (2013.01); *B32B 2262/105* (2013.01); *B32B 2262/106* (2013.01); *B32B 2262/12* (2013.01); *B32B 2307/302* (2013.01); *B32B 2307/72* (2013.01); *B32B 2307/724* (2013.01); *B32B 2307/726* (2013.01); *B32B 2307/732* (2013.01); *B32B 2437/00* (2013.01); *B32B 2571/00* (2013.01); *D10B 2331/042* (2013.01); *D10B 2403/021* (2013.01); *D10B 2501/00* (2013.01)

(58) Field of Classification Search
CPC ............ A41D 2600/20; B32B 2250/03; B32B 2250/20; B32B 2262/0223; B32B 2262/0253; B32B 2262/0261; B32B 2262/0276; B32B 2262/103; B32B 2262/105; B32B 2262/106; B32B 2262/12; B32B 2307/302; B32B 2307/72; B32B 2307/724; B32B 2307/726; B32B 2307/732; B32B 2437/00; B32B 2571/00; B32B 27/12; B32B 27/286; B32B 27/30; B32B 27/306; B32B 27/32; B32B 27/34; B32B 27/36; B32B 27/365; B32B 27/40; B32B 3/08; B32B 5/02; B32B 5/022; B32B 5/024; B32B 5/026; B32B 5/10; B32B 5/26; B32B 7/022; B32B 7/027; D04B 21/207; D04B 21/12; D04B 21/16; D10B 2331/042; D10B 2403/021; D10B 2501/00; D32D 7/022

See application file for complete search history.

(56) References Cited

U.S. PATENT DOCUMENTS

| | | | |
|---|---|---|---|
| 2006/0277951 A1* | 12/2006 | Herr | D04B 21/12 |
| | | | 66/196 |
| 2012/0177904 A1 | 7/2012 | Gehring, Jr. | |
| 2014/0080373 A1* | 3/2014 | Keitch | D04B 21/20 |
| | | | 442/1 |
| 2016/0213078 A1 | 7/2016 | Bibeau | |

FOREIGN PATENT DOCUMENTS

| | | | | |
|---|---|---|---|---|
| WO | WO 02-054896 A1 * | 7/2002 | ............. | D04B 21/10 |
| WO | WO-2005052235 A1 * | 6/2005 | ............. | D04B 21/16 |

OTHER PUBLICATIONS

Whitelaw "Convective Heat Transfer" from Thermopedia.com (https://thermopedia.com/content/660/) (Year: 2011).*

Jan. 2, 2018 International Search Report issued in International Patent Application No. PCT/IB2017/056360.

* cited by examiner

COOLING FABRIC

This application is a 371 of PCT/IB2017/056360 filed Oct. 13, 2017.

The present invention relates to a cooling fabric, and to articles comprising said cooling fabric, preferably to articles of clothing.

The cooling fabric has a capacity to cool the body of a person or animal wearing the fabric.

DETAILED DESCRIPTION

Figure 1:
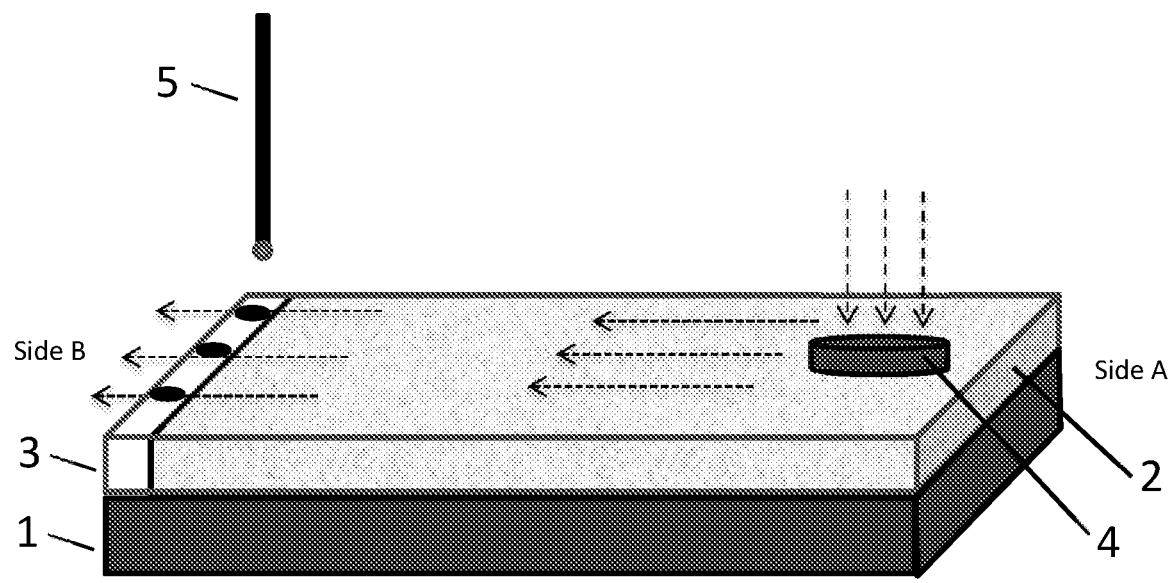
FIG. 1 illustrates an example cooling fabric having a moisture-permeable inner surface layer, a spacer fabric and an outer surface layer.

In various situations, environmental conditions or necessary protective clothing may cause heat accumulation within the clothing of a person. Heat accumulation can lead to overheating which can cause discomfort or even be dangerous for the health of the individual.

For example fire fighters, race drivers or other persons wearing heat-resistant or protective clothing may experience heat accumulation. Cooling fabrics may be worn (e.g. under protective clothing) to transport body heat and humidity away from the body of the person wearing it and to avoid heat accumulation.

Cooling fabrics are known.

EP1367913 and U.S. Pat. No. 6,955,999 describe fabrics comprising an inner moisture-permeable surface layer, a three-dimensional porous layer and an outer layer. US2016/0213078 discloses an insulating garment including such layers. However, there is room for improvement with regard to the cooling capacity and the comfort of such fabrics. It has been found that further improvements are possible in the cooling capacity of cooling fabrics by selecting and combining specific materials for the layers of the cooling fabric, and in particular by carefully selecting the properties of the spacer fabric.

It is an object of the current invention to provide an improved cooling fabric. This task is solved by a cooling fabric comprising a moisture-permeable inner surface layer, a spacer fabric and an outer surface layer, wherein the outer surface layer has an air permeability of at most 250 l/dm$^2$/min at 500 Pa measured according to ISO 9237 and wherein the spacer fabric comprises monofilaments extending across the spacer fabric, wherein the monofilaments have a linear density of at least 250 dtex and wherein the monofilaments are present at a density of at most 800 monofilaments per square-inch.

The moisture-permeable inner surface layer of the cooling fabric is oriented towards the body of the individual wearing the fabric, the outer surface layer is directed away from the body. Preferably, the inner surface layer of the cooling fabric is in direct contact with the skin of the individual.

The cooling fabric according to the invention comprises a spacer fabric located between the moisture-permeable inner surface layer and the outer surface layer.

The spacer fabric comprises a three dimensional spacer fabric or is formed as a three dimensional spacer fabric. Such spacer fabric comprises two separate fabrics which are interconnected by spacer fibers.

The separate fabrics of the spacer fabric may form the moisture-permeable inner surface layer and/or the outer surface layer of the cooling fabric respectively. Alternatively, the moisture-permeable inner surface layer and/or the outer surface layer may be separate layers arranged adjacent to respectively the upper and lower separate fabrics of the spacer fabric.

Thus, the cooling fabric according to the invention encompasses embodiments where the moisture-permeable inner surface layer and the spacer fabric, or the spacer fabric and the outer surface layer, or the moisture-permeable inner surface layer, the spacer fabric and the outer surface layer are integrated with each other during the production process of the spacer fabric or the moisture-permeable inner surface and the outer surface layer may be present as separate layers adjacent to the spacer fabric, all of which layers are arranged on top of each other.

The spacer fabric of the cooling fabric preferably allows an air speed of at least 0.5 m/second, preferably at least 1.0 m/second in a direction perpendicular to the thickness direction of the spacer fabric at an unrestricted air flow of 65 m$^3$/hour.

The relevant airflow is the airflow along the extension direction of the spacer fabric. The air speed of the spacer fabric is determined according to the following method.

A DIN A4 sized piece of the spacer fabric material is placed on top of a fabric or foam soaked in water on a solid, air impermeable support, e.g. in a plastic case.

The spacer fabric material is encased with air impermeable material on all sides, with the exception of the side which is defined by the width and the thickness of the material (side B in FIG. 1) and where it is in contact with the fabric or foam soaked in water.

This may e.g. be realized with a plastic frame having DIN A4-width, a depth which is at least as deep as the spacer fabric material and a length being slightly longer than DIN A4 and a matching lid, or by using air impermeable tape.

The lid covering the top of the spacer fabric material has a round cut-out with a diameter of 80 mm, with the center of the cut-out being located 50 mm from the edge of the material and in the center (side A, FIG. 1). In this opening, an axial slide bearing, direct current type ventilator having a diameter of 80 mm is placed (for example a Sunon KD1208PTS1.13 GN ventilator). The ventilator is set to generate an unrestricted air flow of 65 m$^3$/hour (i.e. the air flow of the generator in ambient air, without resistance from other substance than the ambient air and thus without resistance of the fabric during the testing). The air flows into the spacer fabric and is forced along the extension direction of the material because all other sides are sealed air tight. At the end of spacer fabric material opposite of the ventilator (side B, FIG. 1), the lid comprises 3 further holes arranged in a row and parallel to the edge of the spacer fabric material. The holes are just large enough to allow insertion of a thermal probe. The thermal probe of a thermal anemometer (e.g. Testo 425) is inserted at each of the three positions and the airflow is determined. The average of the three values is calculated and is defined as the air speed (in meter/second [m/s]) in the spacer fabric of the cooling fabric according to the current invention.

A scheme of the set up for determining the air speed is shown in FIG. 1. The reference numbers denominate: 1=solid support with wet fabric or foam, 2=spacer fabric, 3=encasing, 4=cutout for ventilator and ventilator, 5=thermal probe of anemometer, arrows depict airflow direction.

The outer surface layer of the cooling fabric has an air permeability of at most 250 l/dm$^2$/min at 500 Pa measured according to ISO9237 wherein the air permeability is determined in thickness direction of the outer surface layer. Preferably, the outer surface layer has an air permeability of at most 150 l/dm²/min, more preferably, of at most 50 l/dm²/min. In one embodiment the outer surface layer is impermeable to air.

Preferably, the outer surface layer is at least to some extent permeable to moisture, i.e. to vapor (e.g. water vapor), gasses (e.g. air) and liquids (e.g. water). The outer surface layer may be formed as a foil which is attached to the surface layer of the spacer fabric directed away from the body. The outer surface layer may also be formed as a tight fabric, either separated from the spacer fabric or forming a part thereof.

Thus, the cooling fabric according to the invention may comprise an outer surface layer comprising a thermoplastic resin or a polymeric fiber, preferably in form of a foil or an fabric, preferably selected from polyurethane, polyethylene, polypropylene, polyamide, polyester, polycarbonate, polyacetal, polysulfone, meta-aramid, para-aramid or generally from thermoplastic materials which can be drawn into a film, or combinations thereof.

Where the outer surface layer is formed by a foil, the foil may be laminated to the spacer fabric.

Preferably, the spacer fabric has a low air resistance. The air resistance may be determined by determining the pressure drop of an airflow on a sample of the spacer fabric having the size of A4 (210 mm×297 mm). This sample is placed on an airtight solid surface and over one whole width connected to an input for pressurized air (such that the pressurized air enters the spacer fabric from the side, i.e. the thickness direction of the spacer fabric and flows to the opposite site of the fabric). An airtight cover plate is used to cover the sample. The air pressure over the spacer fabric is determined with a U-manometer. One tube of the manometer is placed in the ambient air to determine the air pressure of the surrounding air and the other tube of the manometer is placed between the exit of the input for pressurized air and the entry of the pressurized air into the spacer fabric. The latter tube therefore determines the air pressure that is caused by the resistance of the spacer to the pressurized air. The U-manometer provides the pressure differences ΔP as mm of water column. This ΔP (in mm $H_2O$) indicates the air resistance of the spacer fabric. A small difference (ΔP in mm $H_2O$) indicates a low air resistance.

Measurements are performed under ambient conditions (ca. 20° C. and 50-60% relative humidity).

The air flow of the pressurized air may be set to different values by using a flow meter, for determination of the air resistance of the samples of instant application an air flow of 12 m³/hour was used for the pressurized air. At such an airflow, the spacer fabric preferably has an air resistance of less than 20 (ΔP, in mm $H_2O$), more preferably of less than 15 ΔP mm $H_2O$ and even more preferably of less than 12.5 ΔP mm $H_2O$.

The spacer fabric may have a thickness in the range of 2-20 mm, preferably 3-15 mm, more preferably 4-12 mm, even more preferably 3-10 mm. In one embodiment the spacer fabric has a thickness of 4-6 mm.

The cooling fabric of the invention comprises a spacer fabric, comprising fibers extending across the spacer fabric, i.e. fibers extending across the thickness of the spacer fabric. These fibers extending across the spacer fabric are monofilaments.

They may be arranged perpendicular to the extension direction of the spacer fabric or at an angle. The fibers may be arranged in different patterns. Preferably, the density of the fibers extending across the layer is low, e.g. at most 800 monofilaments per square inch, preferably at most 700 monofilaments per square inch, more preferably at most 600 monofilaments per square inch and even more preferably at most 500 monofilaments per square inch, even more preferably at most 300 monofilaments per square inch or at most 200 monofilaments per square inch. The number of monofilaments per square inch refers to the number of monofilament connection between the separate upper and lower fabric of the spacer fabric. The number may be determined by microscopy, e.g. using a Keyence VHX-5000 microscope and counting the monofilament connections in a representative area (e.g. an area of the enlarged image corresponding to 1 square inch). For a more convenient determination, the monofilaments of spacer fabric may be cut (e.g. in the middle) to separate the upper and lower layer of the area to be counted. Subsequently, the number of monofilaments in an area of the spacer fabric may be counted.

The fibers extending over the spacer fabric and between the separate upper and lower layer of the spacer fabric are monofilaments having a filament linear density of at least 250 dtex. More preferably, the fibers are monofilaments which have a filament linear density of at least 300 dtex, preferably at least 400 and more preferably at least 450 dtex per filament. Generally, the monofilaments may have a maximum linear density of 5000 dtex.

Monofilaments with a high linear density are preferred because they result in a higher compression resistance of the spacer fabric. Also, the high filament linear density allows to lower the number of monofilaments.

The monofilaments or multifilament fibers extending across the spacer fabric may be made from (but not limited to) polyester, polyurethane, polyethylene, polypropylene, polyamide, polyester, polycarbonate, polyacetal, polysulfone, meta-aramid, para-aramids or combinations thereof.

The upper and lower separate fabrics of the spacer fabric preferably comprise multifilament fibers. The multifilament fibers of the upper and lower fabrics of the spacer fabric may be selected from the same polymer as the fibers extending across the layer (as mentioned before for the monofilaments extending across the spacer fabric).

The spacer fabric is preferably a knitted or woven spacer fabric, more preferably knitted.

The fabric construction of the spacer fabric influences the air speed which may be realized in the fabric. Surprisingly, the combination of high linear density of the fibers crossing the spacer fabric and a low density of said fibers per area results in a high air speed in the spacer fabric and finally in an improved cooling capacity of the fabric.

The spacer fabric of the cooling fabric of the invention preferably allows an air speed of at least 0.75 m/s, more preferably at least 1 m/s and even more preferably of at least 1.25 m/s.

In one embodiment the cooling fabric according to the invention comprises a moisture-permeable inner surface layer comprising nanofibers having a filament diameter of at most 5 μm, preferably at most 1 μm, more preferably at most 750 nm. The nanofibers preferably are present in the form of a knitted or woven fabric. In a preferred embodiment the moisture-permeable inner surface layer is a fabric of the double Raschel knit type and using three types of fibers including nanofiber. The Course (c, total amount of horizontal rows or loops) and Wale (w, total amount of vertical rows or loops) in the loop of knitted fabric may be in the range of 5-10 courses/cm and 4-10 wales/cm.

In one embodiment the upper and/or lower separate fabrics of the spacer fabric have an open structure. This means that either in one or both of the separate fabric the yarns are knitted or woven to forms pores, i.e. open spaces, where no fibers of the upper or lower fabrics are present. Preferably, the ratio of pore area to total surface area of the separate fabric is more than 40%, more preferably at least 50%.

The total surface area and the pore area may be determined by microscopy, using e.g. a Keyence VHX-5000 and the integrated software for measuring areas in a 2D microscopy images.

The low monofilament density, potentially in combination with a large pore area ratio, results in an open structure, which probably in turn improves the cooling properties of the cooling fabric.

As explained above, the fibers of the moisture-permeable inner surface layer of the cooling fabric may form the lower separate fabric of the spacer fabric. Thus, the spacer fabric may include nanofibers. Alternatively, a nanofiber fabric is arranged in close proximity to or connected with the lower surface layer of the spacer fabric.

The nanofibers may comprise polyester, polyurethane, polyethylene, polypropylene, polyamide, polyester, polycarbonate, polyacetal, polysulfone, meta-aramid or para-aramid.

Surprisingly, the combination of a spacer fabric having the above described properties and a nanofiber moisture-permeable inner surface layer results in a significantly improved cooling effect of the cooling fabric.

The moisture-permeable inner surface layer is permeable to gases (e.g. air), vapor (e.g. water vapor) and liquids (e.g. water).

In a preferred embodiment, the cooling fabric comprises a spacer fabric comprising monofilaments having a linear density of at least 250 dtex, preferably at least 300 dtex, more preferably at least 400 dtex, arranged at a monofilament density of at most 800, preferably at most 700, more preferably at most 600 monofilaments per square inch, even more preferably at most 500 monofilaments per square inch, or even at most 300 or at most 200 monofilaments per square inch. In a more preferred embodiment, such a spacer fabric is combined with a nanofiber moisture-permeable inner surface layer, wherein the nanofibers have a diameter of at most 1 μm.

In such an embodiment or other embodiments according to the invention, the cooling fabric may comprise thermoconductive fibers. Thermoconductive fibers are fibers having a longitudinal thermal conductivity of at least 10 W/(m K), preferably at least 50 W/(m K), more preferably at least 100 W/(m K) determined according to ASTM E 1225-13; Standard Test Method for Thermal Conductivity of Solids Using the Guarded-Comparative-Longitudinal Heat Flow Technique.

The thermoconductive fibers may be selected from the group of metal fibers, metal-coated fibers, ceramic fibers, carbon fibers, and fibers provided with a coating of a substance having a thermal conductivity of at least 150 W/(m K) determined using the guarded hot flux sensor method according to ASTM E 1225-13; Standard Test Method for Thermal Conductivity of Solids Using the Guarded-Comparative-Longitudinal Heat Flow Technique.

Suitable metals for use as metal fibers or for coating are e.g. copper, aluminum, nickel or zinc. Suitable ceramic fibers include silicon carbide fibers. Thermoconductive substances for coating of fibers may be selected from aluminum nitride, boron nitride and beryllium oxide.

The thermoconductive fibers or a fabric made thereof may be incorporated into the inner moisture-permeable surface layer and/or the spacer fabric by knitting the fibers and/or a fabric made thereof into the fabric construction, or alternatively by incorporating fibers and/or a fabric by embroidering, stitching or lamination.

The present invention is also directed to an article comprising the cooling fabric as described in the various embodiments above. This article preferably is an article of clothing to be worn by a person or animal.

The cooling fabric may especially advantageously be used for clothing articles for firefighters, industrial workers, police officers, soldiers.

The cooling fabric or the article of clothing according to the invention may be combined with protective clothing, e.g. fire- or high temperature resistant protective clothing or helmets. Preferably, the cooling fabric as part of a clothing article or helmet is worn in direct skin contact and other clothing items are arranged on top of it (thus further away from the body).

The article of clothing may be made from the cooling fabric or it may comprise the cooling fabric and at least one other fabric. In the latter embodiment, the cooling fabric is arranged in the article of clothing such that it is placed on zones of the body which produce much heat and moisture, e.g. the upper regions of the human torso (e.g. chest, shoulder blades), neck or head.

For example, the cooling fabric may be combined with a meta-aramid fabric that is placed on the outside of the cooling fabric (i.e. towards the environment). In this embodiment an article of clothing is provided that has cooling properties and heat- or fire-resistant properties.

In a preferred embodiment, the article comprising the cooling fabric also comprises air ventilation means, e.g. at least one ventilator or air pump. This embodiment allows active cooling of the individual wearing the article of clothing.

Preferably, a power source for the air ventilation means is also included, such as e.g. a battery.

The air ventilation means are attached or integrated into the article of clothing, e.g. by insertion into (e.g. 3D-printed) placeholders, by stitching, taping, glueing or incorporation during the fabric braiding process such that they forcibly drive air into the spacer fabric, thereby improving the air circulation and thus heat transport within the spacer fabric.

Preferably, the spacer fabric comprises a channel pattern with an entry opening where the air ventilation means are attached to or integrated into the article of clothing.

Preferably, the air ventilation means and/or the power source are removably attached or integrated into the article of clothing.

Advantageously, the cooling fabric and the article according to the invention have significantly improved cooling capacity, especially in more isolated environments like protective apparel of firefighters or industrial workers, are comfortable to wear and provide protection against environmental heat.

The article according to the invention improves the temperature perception of the person wearing it. For example, when a cooling vest comprising the cooling fabric of the invention is worn by a firefighter below full gear, the firefighter has a comfortable feeling even under physical stress (e.g. uphill running) and increased outside temperature.

Non-limiting examples of cooling fabrics according to the invention and their properties are described below.

EXAMPLE 1

Figure 2A:
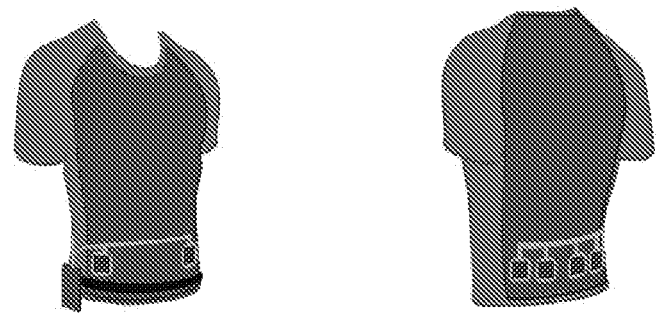
FIGS. 2a and 2b illustrate front and back views of an example cooling garment comprised of the cooling fabric with ventilators.

Several cooling garments made for the size of the human upper body were tested. The cooling fabrics are constructed into a cooling garment as shown in FIG. 2a, in such a way that the front part and the back part (dark grey parts) of the torso are covered with the cooling fabric. In FIG. 2a the left panel presents the front of the garment and the right panel presents the back side of the garment. The sides and the arms of the garment (light gray parts) are made from Lycra® fabric to ensure perfect torso fitting of the garment.

Figure 2B:
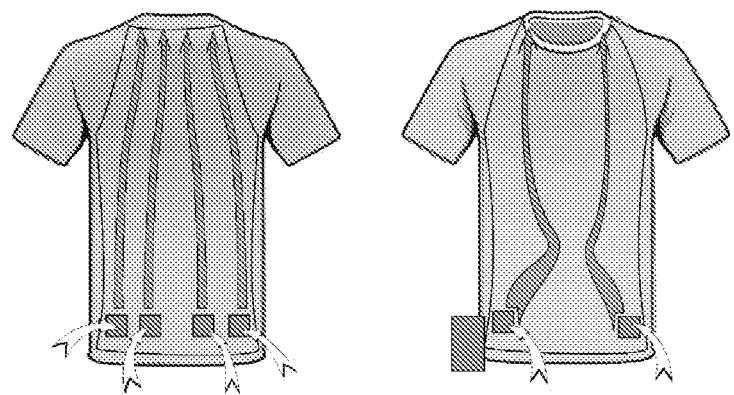

The cooling fabric is provided with several ventilators in order to achieve air flow inside the garment. The ventilators are positioned on the front (2×) and on the back (4×) in a way as is depicted in FIG. 2b. In FIG. 2b the left panel presents the back of the garment and the right panel presents the front side of the garment. The ventilators are powered by means of a battery and are directly blowing into the spacer fabric, at a maximum air flow of 65 m³/hr per ventilator.

Different cooling garments have been tested on a sweating thermal manikin which simulates the heat loss from the human body. The cooling garment test was performed in accordance with ASTM F2371-5. The thermal manikin test conditions used were:
1. Surface temperature (35° C.)
2. Ambient temperature/Relative humidity (%) (25° C./40%)
3. Upper body sweat rate (0.48 L/hr)

The cumulative heat flux (or cooling capacity) is measured during 1 hour testing. The torso of the manikin was dressed in one of the cooling garments described below (Samples 1-9). On top of the cooling garment a standard fire fighter suit was placed which covered the whole manikin, including the lower part of the body, the head and the hands. The cumulative heat flux was determined for the torso part of the body.

Six of the tested cooling garments consist of a moisture-permeable inner surface layer, a spacer fabric and an outer surface layer.

For these cooling garments different spacer fabrics and moisture-permeable inner surface layers were combined. The outer surface layer for Samples 1-6 was a thermoplastic polyurethane film.

Samples 1, 3 and 5 comprise a spacer fabric (1) according to the invention. This type of spacer fabric allows an air speed of 1.3 m/s.

Spacer fabric type 1 has the following properties:

| | |
|---|---|
| Material: | 100% polyethyleneterephthalate |
| Monofilament density: | 155 counts/inch² (24 counts/cm²) |
| Monofilament linear density: | 656 dtex/filament |
| Construction: | warp knit fabric, 6.5 courses per cm, 2 wales per cm |
| Thickness: | 10 mm |
| Surface pore size: | 7 mm |
| Mass per unit area: | 530 g/m² |

In contrast, Spacer fabric type A (comparative) allows an air speed of below 0.5 m/s and has the following properties:

| | |
|---|---|
| Material: | 100% polyethyleneterephthalate |
| Monofilament density: | ca. 3870 counts/inch² (150 counts/cm²) |
| Monofilament linear density: | 33 dtex/filament |
| Construction: | warp knit fabric, 17 courses per cm, 10 wales per cm |
| Thickness: | 5 mm |
| Surface pore size: | 2 mm |
| Mass per unit area: | 432 g/m² |

Both spacer type fabrics were combined with different moisture-permeable inner surface layers: a cotton fabric (standard cotton 10 A, WFK Testgewebe GmbH), a polyester fabric or a polyester nanofiber fabric.

The polyester fabric has the following properties:

| | |
|---|---|
| Fiber diameter: | 2 µm |
| Construction: | warp knit fabric |

The polyester nanofiber fabric has the following properties:

| | |
|---|---|
| Fiber diameter: | 700 nm |
| Construction: | warp knit fabric |

Furthermore, three commercially available cooling garments were also tested in the thermal manikin test (Samples 7-9).

The commercially available cooling garments are E-Cooline (Sample 7), Glacier Tek Cool vest (Sample 8), Rakuten U500B cooling Vest (Sample 9).

Sample 7 is a cooling garment which requires to add water into the vest, Sample 8 is an example of a phase change cooling type garment and Sample 9 is a commercially available example of air cooling.

Table 1 shows the cooling capacity of the different cooling garments:

TABLE 1

Thermal manikin test for determining heat flux

| Sample | MP inner layer | Type of spacer fabric | Air speed in spacer (m/s) | Heat flux (kW/m²) |
|---|---|---|---|---|
| Sample 1 - inv. | Polyester nanofiber | 1 | 1.3 | 306 |
| Sample 2 - comp. | Polyester nanofiber | A | <0.5 | 84 |
| Sample 3 - inv. | Cotton fiber | 1 | 1.3 | 172 |
| Sample 4 - comp. | Cotton fiber | A | <0.5 | 66 |
| Sample 5 - inv. | Polyester fiber | 1 | 1.3 | 275 |
| Sample 6 - comp. | Polyester fiber | A | <0.5 | 95 |
| Sample 7 - comp. | unknown | unknown | unknown | 97 |
| Sample 8 - comp. | unknown | unknown | unknown | 45 |
| Sample 9 - comp. | unknown | unknown | unknown | 52 |

MP—moisture permeable,
inv.—according to the invention,
comp.—comparative

As can be seen from the data of table 2, the cooling garments according to the invention (Samples 1, 3 and 5) clearly outperform the commercially available cooling garments (Samples 7-9), but also the cooling garments where the spacer fabric has an air speed of below 0.5 m/s.

EXAMPLE 2

The cooling capacity of several spacer fabrics was compared.

For this purpose, the air resistance and the evaporation properties of six different spacer fabrics were determined.

Cooling capacity $(W/m^2)$=[Mass loss/time (gram/second)]*K/[area $(m^2)$].

The constant K is the heat of evaporation of water at the used temperature and relative humidity (2400 J/g).

Subsequently, an average value was calculated from the three measurements (in $W/m^2$).

Table 2 shows the properties of the different spacer fabrics

| Sample | Thickness (mm) | Mass/area (g/m$^2$) | Monofilament Filament LD (dtex) | Monofilament density (number/inch$^2$) | Relative pore area (%) | Air resistance (ΔP mm H$_2$O) | Cooling capacity (W/m$^2$) |
|---|---|---|---|---|---|---|---|
| 1 | 10 | 477 | 676 | 155 | 62 | 4.5 | 612 |
| 2 | 10 | 445 | 798 | 77 | 62 | 2.0 | 742 |
| 3 | 10 | 581 | 800 | 77 | 54 | 2.5 | 723 |
| 4 | 6 | 441 | 465 | 142 | 56 | 10 | 755 |
| A | 5 | 429 | 33 | ca. 3870 | 20 | 56 | 469 |
| B | 8.5 | 683 | 233 | 970 | 20 | 22.5 | 591 | n.d. = not determined, estimated to be >1000/inch$^2$

Spacer 1 (according to the invention) and spacer A (comparative) were also used in Example 1. Further, spacers 2-4 (according to the invention) and spacer B (comparative) were also tested. All spacers are made of 100% polyethyleneterephthalate.

The air resistance of the spacers was determined as described above.

The monofilament density and relative pore area were determined by microscopy (as indicated above).

The evaporation properties were determined by the following method:

The experimental setup was made with the intention to simulate a sweating skin covered with a ventilated spacer fabric. The sweating skin is resembled by an water bath set to 35° C. A foam layer is placed on a support into the waterbath, such that the foam is partly emersed in water, but the foam is over its whole thickness saturated with water. For example, a polyether foam of 10 mm thickness may be emersed for 7 mm. The layer of foam assures a steady state water transport to the surface. The spacer fabric to be tested is placed on the foam and serves as a passage for the ambient air that is blown through. Using a ventilator (e.g. a Sunon KD 1208 PTSI 1.8 W ventilator), air is blown into the spacer, in the same way as for the air speed determination (described above and in FIG. 1) but allowing evaporation.

The whole setup (including the water bath, foam, spacer and ventilator) is placed on a precision scale (e.g. Kern DS 20K0.1 0.1) which allows digital analysis of the decrease of weight within a certain timeframe as a measure for the rate of evaporation. The temperature of the water bath, the spacer fabric and the surrounding air were measured with a thermocouple and logged to a file. At the same time the weight was determined (once per second) and also logged to the file. The complete setup is placed in a WEISS WK3-180/40 4.1 kW climate chamber to validate the theoretical expectations under a set temperature of 25° C. and relative humidity (Rh) of 40%. During the tests, the voltage was always set to the ventilator maximum, 12V (and thus 0.15 A).

Based on the mass of evaporated water per time unit (gram/second), the evaporation area of the spacer fabric (A4 size) and the heat of evaporation of water (J/g), a cooling capacity $(W/m^2)$ is determined.

The cooling capacity of each spacer fabric was determined three times at 25° C. and 40% Rh for 10 minutes and calculated by the following formula:

The data show that the spacers used in the invention result in a lower air resistance and higher cooling capacity. This is expected to result in a better cooling effect of the cooling fabrics comprising the spacer fabrics.

The invention claimed is:

1. An article of clothing comprising a cooling fabric comprising
   a moisture-permeable inner surface layer,
   a spacer fabric and
   an outer surface layer,
   wherein the outer surface layer has an air permeability of at most 250 l/dm$^2$/min at 500 Pa measured according to ISO 9237,
   wherein the spacer fabric comprises monofilaments extending across the spacer fabric, wherein the monofilaments have a linear density of at least 676 dtex and wherein the monofilaments are present at a density of 200 monofilaments per square-inch or less, and
   wherein the article of clothing further comprises at least one air ventilator and at least one power source that provides power to the at least one air ventilator, and wherein the spacer fabric comprises a channel pattern with an entry opening where the at least one air ventilator is attached to or integrated into the article of clothing to forcibly drive air into the spacer fabric.

2. The article of clothing according to claim 1 comprising thermoconductive fibers.

3. The article of clothing according to claim 2 wherein the thermoconductive fibers are selected from the group of metal fibers, metal-coated fibers, ceramic fibers, carbon fibers, and fibers provided with a coating of a substance having a thermal conductivity of at least 150 W/(m K).

4. The article of clothing according to claim 1 wherein the spacer fabric has a thickness of at least 2 mm.

5. The article of clothing according to claim 1 wherein the outer surface layer comprises a thermoplastic resin or a fiber.

6. The article of clothing according to claim 1 wherein the spacer fabric has an air speed of at least 0.5 m/s in a direction perpendicular to the thickness direction of the spacer fabric at an unrestricted air flow of 65 m$^3$/hour.

7. The article of clothing according to claim 6 wherein the spacer fabric has an air speed of at least 0.75 m/s in a direction perpendicular to the thickness direction of the spacer fabric at an unrestricted air flow of 65 m$^3$/hour.

8. The article of clothing according to claim 1 wherein the moisture-permeable inner surface layer comprises nanofiber having a filament diameter of at most 5 μm.

9. The article of clothing according to claim 1 wherein the moisture-permeable inner surface layer is formed as part of the spacer fabric.

* * * * *